United States Patent [19]
BeMent et al.

[11] Patent Number: 5,701,410
[45] Date of Patent: Dec. 23, 1997

[54] METHOD AND SYSTEM FOR DETECTING FAULT CONDITIONS ON MULTIPLEXED NETWORKS

[75] Inventors: Bradley Earl BeMent; Kevin Mark Tiedje, both of Farmington Hills; Robert Dennis Crawford, Livonia, all of Mich.

[73] Assignee: Ford Motor Company, Dearborn, Mich.

[21] Appl. No.: 709,944

[22] Filed: Sep. 9, 1996

[51] Int. Cl.$^6$ ........................................... G06F 11/34
[52] U.S. Cl. ..................... 395/183.19; 340/825.16; 340/825.04; 371/57.1; 371/70; 370/242; 370/248
[58] Field of Search ............... 371/57.1, 48, 70, 371/68.1, 68.2, 11.2; 395/183.19, 185.02, 185.03, 182.19; 340/825.16, 825.01, 825.03, 825.04, 827; 370/242, 245, 248

[56] References Cited

U.S. PATENT DOCUMENTS

| | | | |
|---|---|---|---|
| 4,792,950 | 12/1988 | Volk et al. ........................ | 371/8 |
| 5,031,117 | 7/1991 | Magne et al. ..................... | 371/8.2 |
| 5,295,132 | 3/1994 | Hashimoto et al. ............... | 370/13 |
| 5,347,543 | 9/1994 | Lecoco et al. .................... | 375/36 |
| 5,465,255 | 11/1995 | Tanaka et al. .................... | 370/85.1 |
| 5,488,306 | 1/1996 | Bonaccio .......................... | 324/539 |
| 5,528,754 | 6/1996 | Okamoto ........................... | 395/183.19 |

*Primary Examiner*—Phung Chung
*Attorney, Agent, or Firm*—Paul K. Godwin; Roger L. May

[57] ABSTRACT

A method for detecting fault conditions on a multiplexed network having first and second busses. The method includes sensing a start of frame delimiter (SOF) for the first bus, and determining the state of the second bus when the SOF is sensed. If the state of the second bus has been passive over a first selected time period, the state of a differential between the first and second busses is determined. If the state of the differential between the first and second busses is not indicative of a pre-qualified start of frame delimiter, then a passive fault is indicated. Additionally, the method includes sensing an end of frame delimiter (EOF) for the first bus, and determining the state of the second bus when the EOF is sensed. If the state of the second bus has been active over a selected time period, then an active fault for the second bus is indicated. A system for performing the method is also disclosed.

18 Claims, 4 Drawing Sheets

METHOD AND SYSTEM FOR DETECTING FAULT CONDITIONS ON MULTIPLEXED NETWORKS

TECHNICAL FIELD

This invention relates to a method and system for detecting passive and active fault conditions on multiplexed networks.

BACKGROUND ART

In dual wire multiplex communication systems as defined by the Society of Automotive Engineers in SAE J1850, the possibility exists for one or more of the network wires to become opened or shorted, potentially degrading network performance. A reliable means of detecting faults is thus required for fault management and diagnostic purposes.

Conventional methods of network fault detection, such as the one described in U.S. Pat. No. 4,792,950 issued to Volk et al. ("the Volk '950 patent"), utilize three receive channels for fault decoding. The first channel, called channel B, monitors the BUS+ wire. The second channel, called channel A, monitors the BUS− wire. The third channel, called channel D (for differential channel), monitors the BUS+ and BUS− wires differentially. Each channel has a bit decoder capable of recognizing the network elements outlined in SAE J1850, and fault detection is performed by examining the output of each receive channel at some specified time.

The method described in the Volk '950 patent performs fault detection by opening a fault detection window for all three channels any time a first pre-qualified start-of-message is detected on any of the three channels. The first pre-qualified start-of-message is defined in terms of a "start-of-message", which is equivalent to the SAE J1850 "Start-Of-Frame" (SOF) term. At the close of that window, if a second pre-qualified start-of-message is not detected on all three channels, a fault is indicated. The second pre-qualified start-of-message is also defined in terms of the SAE J1850 SOF.

Significantly, the fault detection method of the Volk '950 patent is only capable of specifically identifying "stuck active" type faults. Moreover, practical experience has shown that this method can be inaccurate under certain faulted network conditions, as it is common for erroneous pre-qualified start-of-message delimiters to appear during the course of communications when open faults are present.

Thus, there exists a need for a fault detection method and system having improved accuracy in the detection of open and shorted network wires in dual wire SAE J1850 multiplex communication systems. Such a method and system would allow interface devices to specifically detect "open", "stuck passive", and "stuck active" network faults in dual wire SAE J1850 multiplex communication systems, thereby improving the accuracy of reported faults over prior methods.

DISCLOSURE OF INVENTION

Accordingly, it is the principle object of the present invention to provide an improved method and system for detecting fault conditions on a multiplexed network.

According to the present invention, then, a method is provided for detecting a passive fault condition on a multiplexed network including first and second busses, the first and second busses and a differential therebetween each having an active and a passive state. The method comprises sensing a start of frame delimiter (SOF) for the first bus, and determining the state of the second bus when the SOF for the first bus is sensed. If the state of the second bus determined is passive, the method also comprises determining the state of the second bus over a first selected time period ending when the SOF for the first bus is sensed. If the state of the second bus determined over the first selected time period is passive, the method further comprises determining the state of the differential between the first and second busses over a second selected time period ending when the SOF for the first bus is sensed. The method still further comprises indicating a passive fault for the second bus if the state of the differential between the first and second busses over the second selected time period is not indicative of a pre-qualified start of frame delimiter.

According to another embodiment of the present invention, a method is also provided for detecting an active fault condition on such a multiplexed network. In this embodiment, the method comprises sensing an end of frame delimiter (EOF) for the first bus, and determining the state of the second bus when the EOF for the first bus is sensed. If the state of the second bus determined is active, the method also comprises determining the state of the second bus over a selected time period ending when the EOF for the first bus is sensed. The method still further comprises indicating an active fault for the second bus if the state of the second bus determined over the selected time period is active.

The present invention also provides a system for detecting a passive fault condition on a multiplexed network including first and second busses, the first and second busses and a differential therebetween each having an active and a passive state. The system comprises means for sensing a start of frame delimiter (SOF) for the first bus, means for determining the state of the second bus when the SOF for the first bus is sensed, and means for determining the state of the second bus over a first selected time period ending when the SOF for the first bus is sensed if the state of the second bus determined is passive. The system further comprises means for determining the state of the differential between the first and second busses over a second selected time period ending when the SOF for the first bus is sensed if the state of the second bus determined over the first selected time period is passive, and means for indicating a passive fault for the second bus if the state of the differential between the first and second busses over the second selected time period is not indicative of a pre-qualified start of frame delimiter.

Similarly, in another embodiment, the present invention also provides a system for detecting an active fault condition on such a multiplexed network. In this embodiment, the system comprises means for sensing an end of frame delimiter (EOF) for the first bus, and means for determining the state of the second bus when the EOF for the first bus is sensed. The system further comprises means for determining the state of the second bus over a selected time period ending when the EOF for the first bus is sensed if the state of the second bus determined is active, and means for indicating an active fault for the second bus if the state of the second bus determined over the selected time period is active.

These and other objects, features and advantages will be readily apparent upon consideration of the following detailed description in conjunction with the accompanying drawings.

BEST MODE FOR CARRYING OUT THE INVENTION

Figure 1:
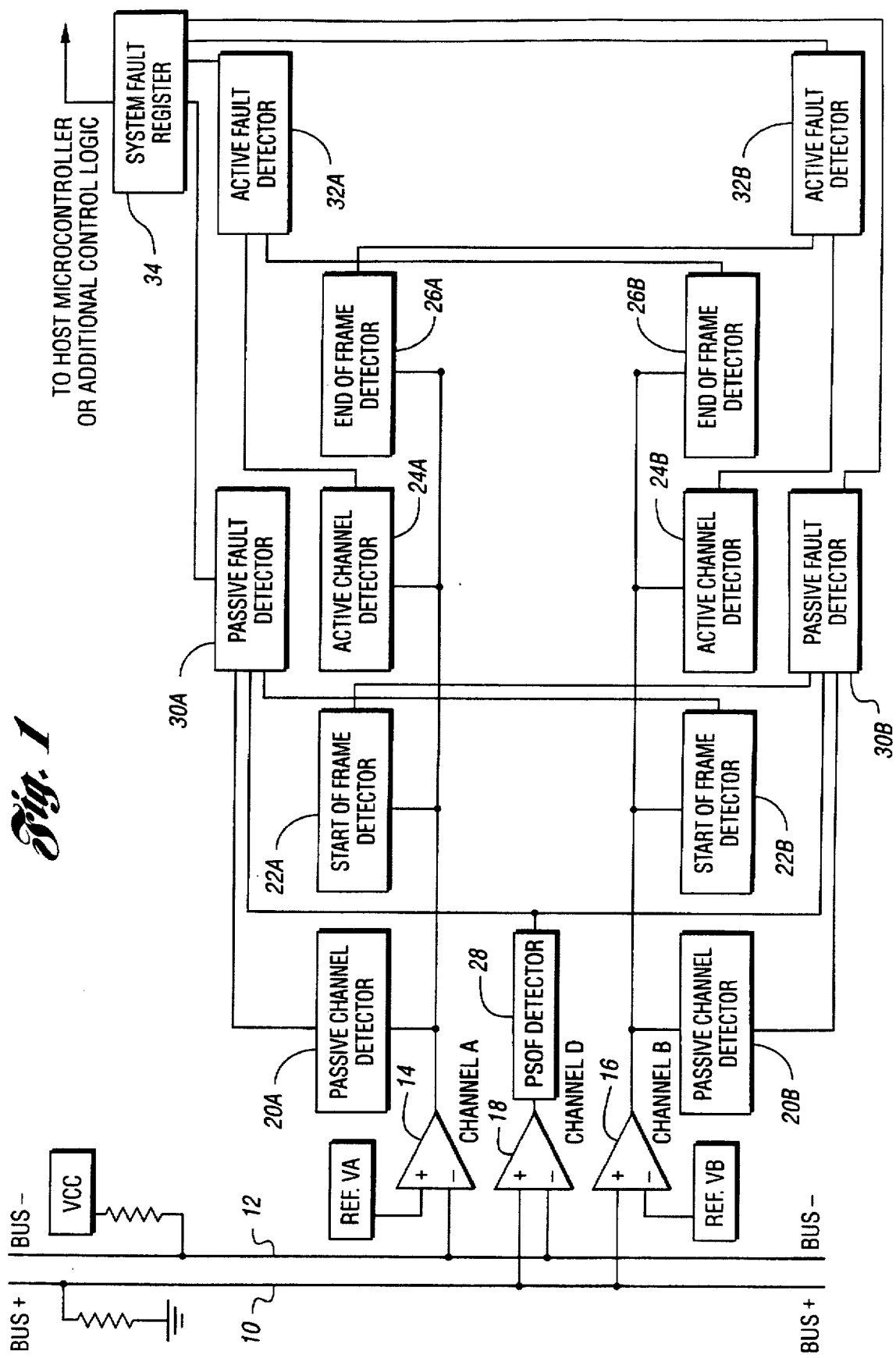
FIG. 1 illustrates a block diagram of the system of the present invention.
Figure 2:
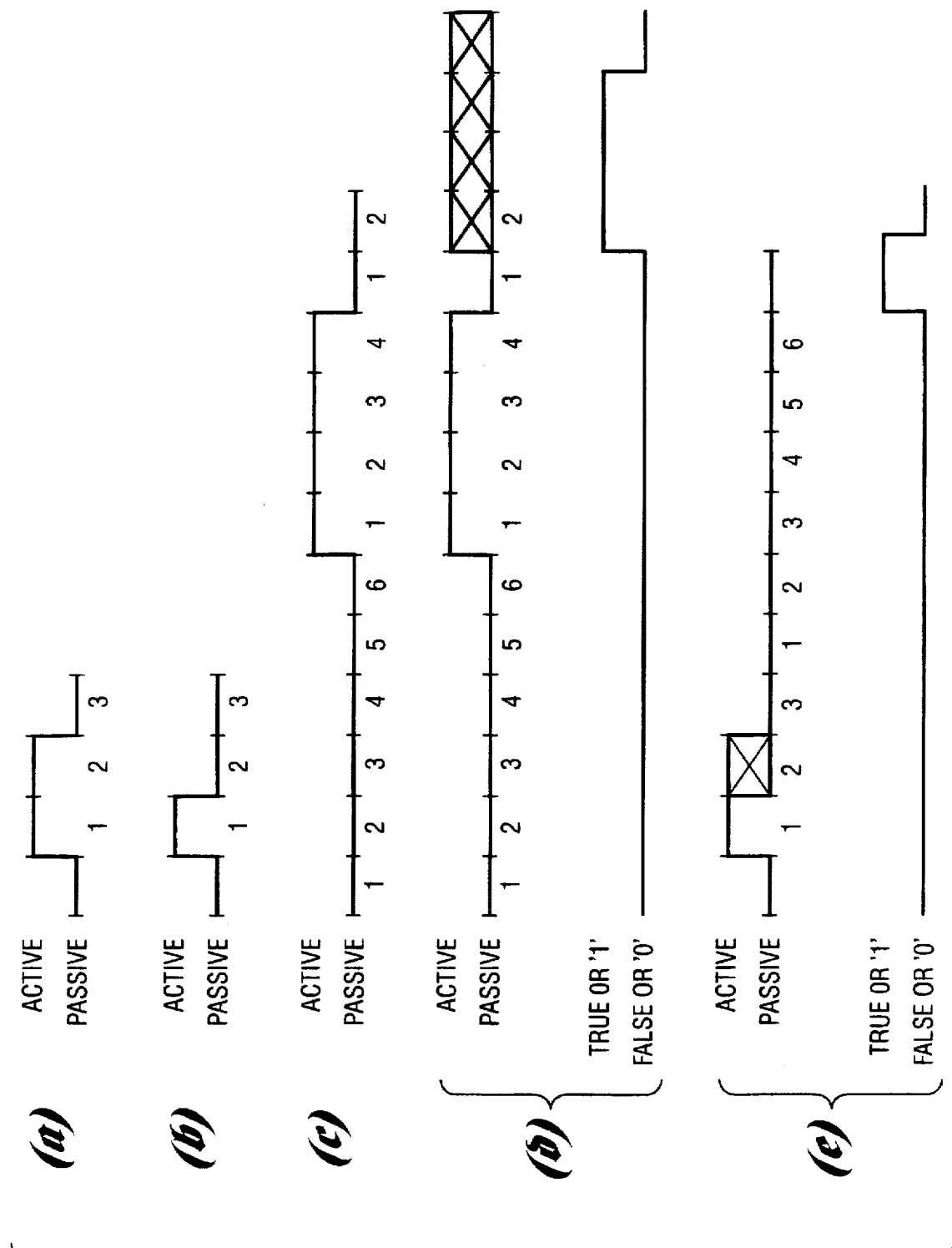
FIGS. 2a–2e illustrate standard SAE J1850 frame symbol encoding and PSOF detection.
Figure 3:
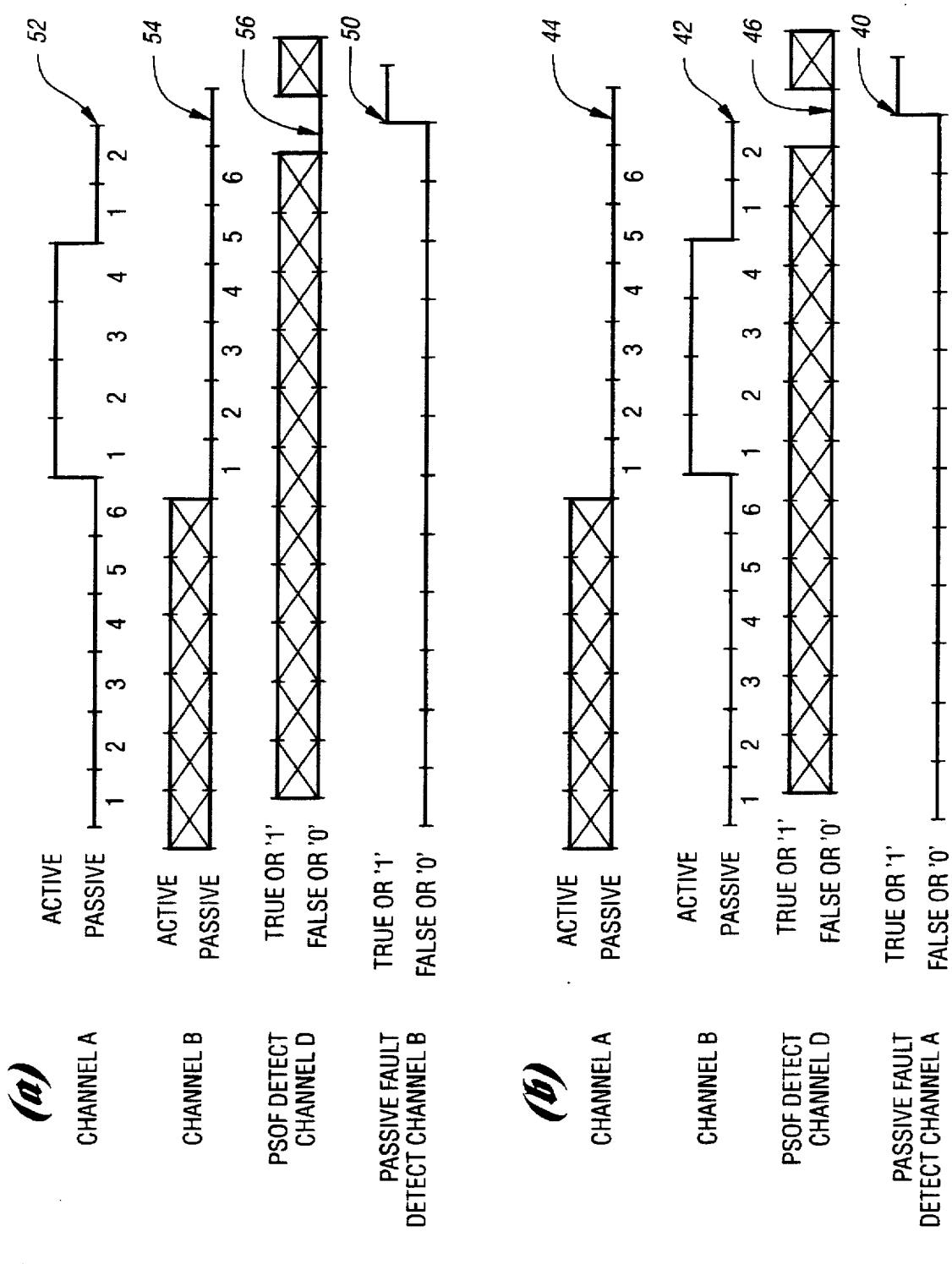
FIGS. 3a and 3b illustrate the detection of passive faults on channels A and B according to the method and system of the present invention.
Figure 4:
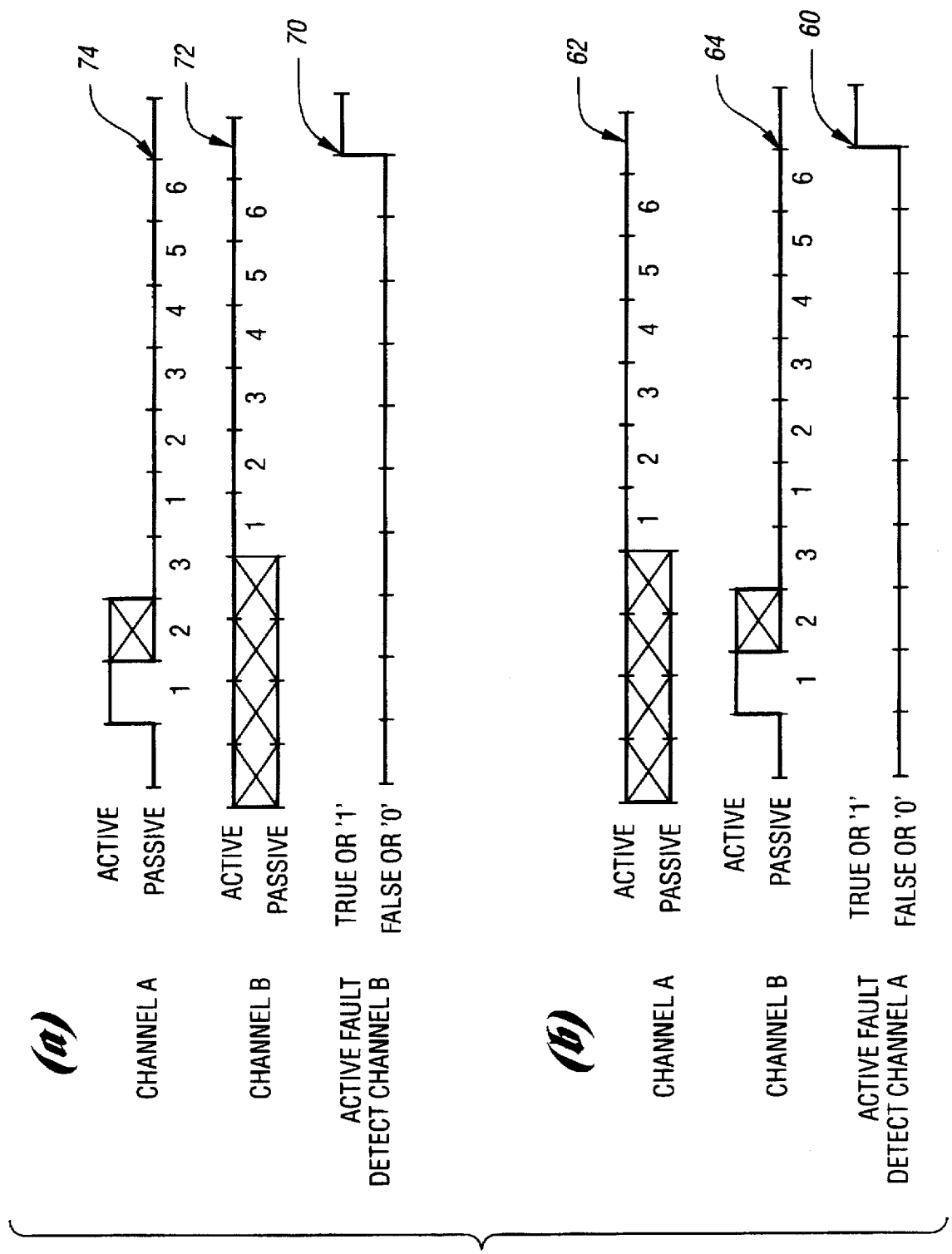
FIG. 4a and 4b illustrate the detection of active faults on channels A and B according to the method and system of the present invention.

With reference to FIGS. 1–4, the preferred embodiment of the method and system of the present invention will now be described. Referring first to FIG. 1, a block diagram of the system of the present invention is shown. As seen therein, three receive channels are provided for monitoring complimentary network wires BUS+ (10) and BUS− (12). More specifically, as described above, channel A (14) compares the voltage of BUS− (12), which may alternate between approximately 5 volts and approximately 0 volts, to a reference voltage in order to determine whether BUS− (12) has an active or passive state. Similarly, channel B (16) monitors the state of BUS+ (10). Channel D (18) compares the voltages of BUS+ (10) and BUS− (12) to determine whether the state of the differential is active or passive. In this regard, channels A (14), B (16) and D (18) operate as in the prior art described above.

The outputs of channels A (14) and B (16), which indicate the active/passive states of BUS− (12) and BUS+ (10), respectively, are fed to respective passive channel detectors (20A, 20B), start of frame (SOF) detectors (22A, 22B), active channel detectors (24A, 24B), and end of frame (EOF) detectors (26A, 26B). Passive channel detectors (20A, 20B) detect when the corresponding channel is passive and has been passive for the preceding two bit periods. Active channel detectors (24A, 24B) detect when the corresponding channel is active and has been active for the preceding two bit periods. SOF detectors (22A, 22B) and EOF detectors (26A, 26B) detect standard SAE J1850 SOF and EOF delimiters.

Referring now to FIGS. 2a–2e, standard SAE J1850 frame symbol encoding is shown. As seen in FIG. 2c, an SOF delimiter may be defined as six passive bit phases followed by four active bit phases, followed by two passive bit phases. As seen in FIG. 2e, an EOF delimiter may be defined as a Pulse Width Modulation (PWM) 0 or 1 bit, followed by six passive bit phases. A PWM 0 bit may be defined, as seen in FIG. 2a, as a passive to active transition, followed by two active bit phases, followed by one passive bit phase. A PWM 1 bit may be defined, as seen in FIG. 2b, as a passive to active transition, followed by one active bit phase, followed by two passive bit phases.

Referring again to FIG. 1, the output of channel D (18), which indicates the active/passive state of the differential between BUS+ (10) and BUS− (12), is fed to pre-qualified start of frame (PSOF) detector (28). PSOF detector (28) detects a pre-qualified start of frame which is defined as 5/6 of a standard SAE J1850 SOF delimiter. More specifically, as seen in FIG. 2d, a PSOF may be defined as a sequence of six passive bit phases followed by four active bit phases followed by one passive bit phase. Thus, the output of the channel D (18) PSOF detector (28) remains false until such a sequence is detected on channel D (18), at which point the output becomes true for a duration of one bit period (3 bit phases). This compensates for timing skew that may exist between Channel D (18) and the other channels.

Still referring to FIG. 1, passive fault detectors (30A, 30B) are also provided for channels A (14) and B (16), respectively. More specifically, passive fault detector (30A) receives input from passive channel detector (20A), PSOF detector (28), and SOF detector (22B). Similarly, passive fault detector (30B) receives input from passive channel detector (20B), PSOF detector (28), and SOF detector (22A).

In that regard, referring now to FIGS. 3a and 3b, the detection of passive faults on channels A and B according to the method and system of the present invention is shown. As seen in FIG. 3b, and with continuing reference to FIG. 1, the method and system of the present invention indicate a passive fault (40) for channel A (14) if and only if two conditions are both true at the instant (42) a SOF is detected by SOF detector (22B) on channel B (16). First, passive channel detector (20A) must indicate that channel A (14) is passive and has been passive for the two preceding bit periods (44). Second, the output of the channel D PSOF detector (28) must be false (46). A passive fault on channel A (14) is indicative of a "stuck passive" or "open" fault on channel A (14) or the BUS− (12) network wire.

Similarly, as seen in FIG. 3a, and with continuing reference to FIG. 1, the method and system of the present invention indicate a passive fault (50) for channel B (16) if and only if two conditions are both true at the instant (52) a SOF is detected by SOF detector (22A) on channel A (14). First, passive channel detector (20B) must indicate that channel B (16) is passive and has been passive for the two preceding bit periods (54). Second, the output of the channel D PSOF detector (28) must be false (56). A passive fault on channel B (16) is indicative of a "stuck passive" or "open" fault on channel B (16) or the BUS+ (10) network wire.

Referring again to FIG. 1, active fault detectors (32A, 32B) are also provided for channels A (14) and B (16), respectively. More specifically, active fault detector (32A) receives input from active channel detector (24A) and EOF detector (26B). Similarly, active fault detector (32B) receives input from active channel detector (24B) and EOF detector (26A).

In that regard, referring now to FIGS. 4a and 4b, detection of active faults on channels A and B according to the method and system of the present invention is shown. As seen in FIG. 4b, and with continuing reference to FIG. 1, the method and system of the present invention indicate an active fault (60) for channel A (14) if and only if active channel detector (24A) indicates channel A (14) is active and has been active for the two preceding bit periods (62) at the instant an EOF is detected (64) by EOF detector (26B) on channel B (16). An active fault on channel A (14) is indicative of a "stuck active" or "open" fault on channel A (14) or the BUS− (12) network wire.

Similarly, as seen in FIG. 4a, and with continuing reference to FIG. 1, the method and system of the present invention indicate an active fault (70) for channel B (16) if and only if active channel detector (24B) indicates channel B (16) is active and has been active for the two preceding bit periods (72) at the instant an EOF is detected (74) by EOF detector (26A) on channel A (14). An active fault on channel B (16) is indicative of a "stuck active" or "open" fault on channel B (16) or the BUS+ (10) network wire.

Referring again to FIG. 1, the system preferably also comprises a fault register (34). More specifically, fault register (34) receives input from each of the passive and active fault detectors (30A, 30B, 32A, 32B). In this fashion, fault register (34) may be used to maintain a record of detected faults for a host microcontroller or appropriate control logic.

As is readily apparent from the foregoing description, then, the present invention provides an improved method and system for detecting fault conditions on a multiplexed network. More specifically, the present invention provides a method and system for more accurately detecting both passive and active faults on dual wire multiplexed communication systems as defined in SAE J1850. Those of ordinary skill in the art will further recognize that the digital implementation of the preferred embodiment of the present invention described above is also more tolerant of bus terminations and ground offset variations on the analog side.

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. A method for detecting a passive fault condition on a multiplexed network including first and second busses, the first and second busses and a differential therebetween each having an active and a passive state, the method comprising:

sensing a start of frame delimiter (SOF) for the first bus;

determining the state of the second bus when the SOF for the first bus is sensed;

if the state of the second bus determined is passive, determining the state of the second bus over a first selected time period ending when the SOF for the first bus is sensed;

if the state of the second bus determined over the first selected time period is passive, determining the state of the differential between the first and second busses over a second selected time period ending when the SOF for the first bus is sensed; and indicating a passive fault for the second bus if the state of the differential between the first and second busses over the second selected time period is not indicative of a pre-qualified start of frame delimiter.

2. The method of claim 1 wherein the first selected time period is six bit phases.

3. The method of claim 1 wherein the second selected time period is eleven bit phases.

4. The method of claim 1 wherein the first and second busses comprise complimentary network wires.

5. The method of claim 1 further comprising recording an indication of a passive fault.

6. A method for detecting an active fault condition on a multiplexed network including first and second busses, the first and second busses and a differential therebetween each having an active and a passive state, the method comprising:

sensing an end of frame delimiter (EOF) for the first bus;

determining the state of the second bus when the EOF for the first bus is sensed;

if the state of the second bus determined is active, determining the state of the second bus over a selected time period ending when the EOF for the first bus is sensed; and indicating an active fault for the second bus if the state of the second bus determined over the selected time period is active.

7. The method of claim 6 wherein the selected time period is six bit phases.

8. The method of claim 6 wherein the first and second busses comprise complimentary network wires.

9. The method of claim 6 further comprising recording an indication of an active fault.

10. A system for detecting a passive fault condition on a multiplexed network including first and second busses, the first and second busses and a differential therebetween each having an active and a passive state, the system comprising:

means for sensing a start of frame delimiter (SOF) for the first bus;

means for determining the state of the second bus when the SOF for the first bus is sensed;

means for determining the state of the second bus over a first selected time period ending when the SOF for the first bus is sensed if the state of the second bus determined is passive;

means for determining the state of the differential between the first and second busses over a second selected time period ending when the SOF for the first bus is sensed if the state of the second bus determined over the first selected time period is passive; and means for indicating a passive fault for the second bus if the state of the differential between the first and second busses over the second selected time period is not indicative of a pre-qualified start of frame delimiter.

11. The system of claim 10 wherein the first selected time period is six bit phases.

12. The system of claim 10 wherein the second selected time period is eleven bit phases.

13. The system of claim 10 wherein the first and second busses comprise complimentary network wires.

14. The system of claim 10 further comprising means for recording an indication of a passive fault.

15. A system for detecting an active fault condition on a multiplexed network including first and second busses, the first and second busses and a differential therebetween each having an active and a passive state, the system comprising:

means for sensing an end of frame delimiter (EOF) for the first bus;

means for determining the state of the second bus when the EOF for the first bus is sensed;

means for determining the state of the second bus over a first selected time period ending when the EOF for the first bus is sensed if the state of the second bus determined is active; and means for indicating an active fault for the second bus if the state of the second bus determined over the selected time period is active.

16. The system of claim 15 wherein the selected time period is six bit phases.

17. The system of claim 15 wherein the first and second busses comprise complimentary network wires.

18. The system of claim 15 further comprising means for recording an indication of an active fault.

* * * * *